Aug. 6, 1968  R. F. SCHMOEGER  3,395,620
SCREW MEANS FOR ATTACHING MOUNTING BRACKETS AND CYLINDER
HEADS TO A POWER CYLINDER BODY
Filed April 19, 1966
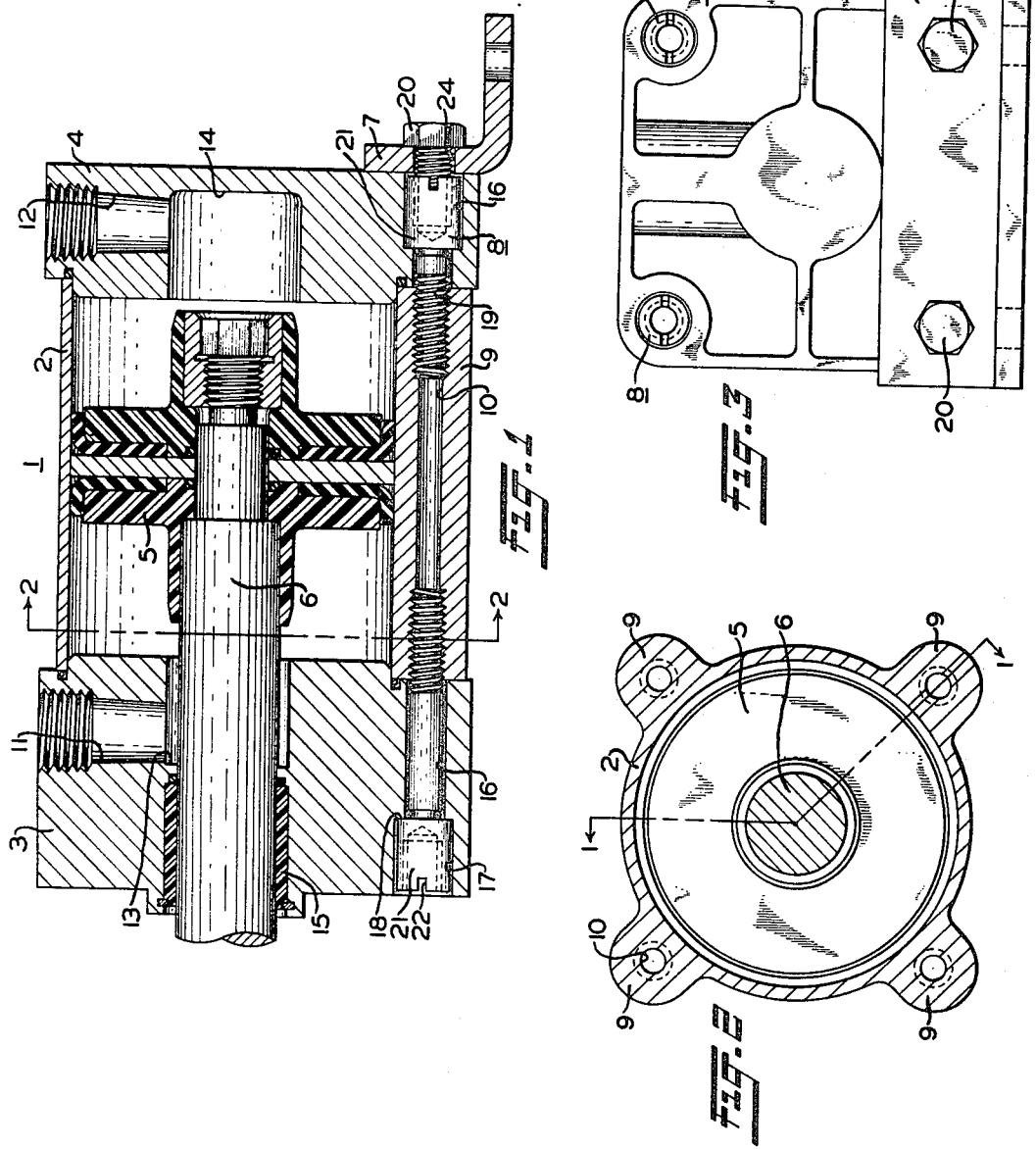
INVENTOR.
RALPH F. SCHMOEGER
BY
Ralph W. McIntire, Jr.
ATTORNEY

United States Patent Office 3,395,620
Patented Aug. 6, 1968

3,395,620
SCREW MEANS FOR ATTACHING MOUNTING BRACKETS AND CYLINDER HEADS TO A POWER CYLINDER BODY
Ralph F. Schmoeger, Lexington, Ky., assignor to Westinghouse Air Brake Company, Wilmerding, Pa., a corporation of Pennsylvania
Filed Apr. 19, 1966, Ser. No. 543,612
3 Claims. (Cl. 92—161)

ABSTRACT OF THE DISCLOSURE

Screw means for attaching mounting brackets and cylinder heads to a power cylinder body in which a first screw attaching the cylinder head to the power cylinder body has a head fully inserted in a counterbore in the cylinder head, which head includes a threaded axial bore receiving therein a cap screw attaching a bracket to the cylinder head. Where the cylinder head is of low tensile strength prone to stripping, the screws are comprised of material having a higher tensile strength than the cylinder head.

In the previous construction of industrial power cylinders, cylinder heads are attached to the opposite ends of the cylinder body by tie rods interconnecting the cylinder heads externally of the cylinder body, or by screws extending through each head into tapped holes in the end faces of the cylinder body, the latter being disclosed and claimed in copending application Ser. No. 543,618, filed Apr. 19, 1966 and assigned to the same assignee as the present invention. Thereafter, to attach body mounting brackets to the cylinder heads, separate body holes are drilled and tapped in the cylinder heads to receive cap screws for attaching the brackets to the cylinder heads.

Also in the construction of industrial power of cylinders to achieve lightness and strength, aluminum rather than steel or other materials is now frequently used as the construction material for the cylinder heads. However, because of the low tensile strength of aluminum compared with steel, the use of steel screws in the tapped holes in aluminum for attaching the mounting brackets to the cylinder heads promotes a tendency for the threads to strip, thus necessitating the use of steel screw thread inserts disposed in special taps in the cylinder head.

It is an object of this invention to provide a new and novel screw device serving to attach the cylinder heads to the cylinder body, and at the same time serve in turn as a means for receiving bracket mounting cap screws, to thus completely eliminate the need for the separate cylinder head taps usually provided to receive bracket mounting screws. Where aluminum cylinder heads are used, the elimination of separate cylinder head taps also eliminates the aforementioned additional need for steel thread inserts heretofore found necessary.

In the present invention, this object is achieved by attaching the cylinder heads, either steel or aluminum or other material, to the ends of a steel cylinder body by means of steel cylinder head screws having tapped holes in their head portions to receive additional steel cap screws which attach the mounting brackets directly to the cylinder head screws.

This and other objects will become more readily apparent in the following description, taken in conjunction with the drawing, in which:

FIG. 1 is a side elevational view, taken partly in section, of a cylinder device showing my invention; and taken substantially along the line 1—1 of FIG. 2;

FIG. 2 is a cross-sectional view of the cylinder device of FIG. 1, taken substantially along the line 2—2 of FIG. 1; and FIG. 3 is an end view of the cylinder device of FIG. 1 taken from the right-hand end thereof.

Referring now to the drawing, there is shown a fluid pressure operated power cylinder generally indicated at 1 and comprising a cylinder body 2, a pair of cylinder heads 3 and 4, a piston assembly 5, a piston rod 6, a bracket member 7, and screw means generally indicated at 8 attaching the brackets to the cylinder heads and attaching the cylinder heads to the cylinder body.

The cylinder body 2 is the same as that disclosed and claimed in the aforementioned copending application and comprises a tubular member having externally disposed thereon and integral therewith a plurality of ribs 9 longitudinally extending the full length of the tubular body. The ribs may be solid, not shown, or may include through bore 10 tapped at their ends to receive cylinder head mounting screws hereinafter described in detail. If the ribs are solid, the end faces thereof are drilled and tapped to receive the mounting screws.

The piston assembly 5 and piston rod 6 may be of any conventional type and accordingly are not specifically described herein.

The cylinder heads 3 and 4 are substantially conventional and are adapted for sealing engagement with the opposite ends of the cylinder body 5, and include combined supply and exhaust ports 11 and 12, respectively, communicating with cavity 13 and 14, respectively, with the cavities each opening at the corresponding end of the cylinder to supply fluid pressure to or exhaust fluid pressure from the corresponding end of the cylinder body, depending upon whether the respective ports 11 and 12 are being used as supply or exhaust ports, respectively. The piston rod 6 is received through the cylinder head 3 for reciprocal movement therewith at piston rod bearing 15.

The cylinder heads 3 and 4 are each provided with a plurality of through bores 16, each through bore being disposed in axial coincidence with one of the tapped ends of through bores 10 in the ends of the ribs 9 when the head is abutted with the corresponding end of the cylinder body 2. A counterbore 17 is provided at the outer end of each through bore forming a shoulder 18 for purposes hereinafter described.

The screw means 8 comprises a plurality of cylinder head screws 19 attaching each cylinder head to the corresponding end of the cylinder body 2, and a cap screw 20 cooperating with the cylinder head screw to attach the bracket 7 to the cylinder head.

The cylinder head screw 19 is inserted in the through bore 16 and includes threads at one end received in the tapped end of through bore 10 in the cylinder body 2. The other end of the screw 19 is provided with a head 21 received in counterbore 17 and engaged at its inner end with shoulder 18 so that tightening of the screw in tapped bore 10 by means of a tool, now shown, engaged in transverse slot 22 at the outer end of head 21, effects sealing engagement of the cylinder head with the end of the cylinder body 2. The head 21 of cylinder head screw 19 includes a tapped hole 23 and threadedly receives therein the cap screw 20 received through bores 24 in the upright member of bracket 7, to thus attach the bracket directly to cylinder head screw 19.

The axial length of head 21 of the cylinder head screw 19 is preferably equal to, or even more preferably less than the depth of counterbore 17 so that the tightening of cap screw 20 in tapped hole 23 of the cylinder head screw will effect engagement of the inner surface of upright member of bracket 7 with the outer end surface of the corresponding head to facilitate a more rigid and secure support of the cylinder body and to provide a wider distribution of force over the bracket and the cylinder head.

It is apparent from the foregoing description, that attaching the bracket directly to the cylinder head screw by a cap screw eliminates the need for separate cylinder head taps for receiving bracket attaching cap screws. Moreover, where the cylinder head is constructed from material having a relatively low tensile strength, such as aluminum, whereby cylinder head taps have a propensity for stripping and thus necessitate the use of threaded inserts therein of a harder material, the foregoing invention is particularly advantageous, and, inasmuch as the cylinder body, cylinder head screws and cap screws may be constructed of a suitable high tensile strength material such as steel, in disregard of the cylinder head construction material, the invention serves its purpose whether the cylinder head is constructed of steel or aluminum or other material suitable for cylinder head construction.

From the foregoing, it is understood that, if desired, the present invention is applicable to the opposite ends of otherwise conventional tie rods by disposing the nut or head end thereof in a counterbore in the outside of the cylinder head and providing a threaded bore in the head or rod end to receive a bracket attaching head screw, or, if a suitably elongated nut with a closed end is used, by drilling and tapping a bore in the closed end of the nut.

Having now described the invention, what I claim as new and desire to secure by Letters Patent is:

1. In a cylinder device having a cylinder body and a pair of cylinder heads, one of said cylinder heads disposed at each end of said cylinder body:
    (a) said cylinder body having a plurality of threaded bores in each end face thereof;
    (b) each of said pair of cylinder heads having a plurality of through bores, each coaxially disposed with one of said threaded bores;
    (c) each of said through bores having a counterbore forming a shoulder between said through bore and said counterbore;
    (d) a cylinder head screw disposed in each through bore and having threads received in the corresponding one of said threaded bores, and having a head engaging the corresponding shoulder to sealingly engage the corresponding cylinder head with the corresponding end of said cylinder when each said screw is tightened;
    (e) a threaded bore axially disposed in each screw head;
    (f) each said screw head having a length axially of said screw such that the head is fully inserted in said counterbore when the screw is tightened;
    (g) means on the distal end of each screw head engagable by a tool to screw said cylinder head screw into the corresponding threaded bore in said cylinder body with each screw head engageable with the corresponding shoulder;
    (h) a cylinder support bracket disposed in flush engagement with the end face of one cylinder head, and having at least one through bore aligned with a threaded bore in one of said screw heads; and
    (i) a cap screw extending through said through bore in said bracket into said threaded bore in said one of said screw heads to attach the bracket to the cylinder head.

2. In a cylinder device as recited in claim 1, a support bracket attached to the other of said cylinder heads.

3. In combination:
    (a) a first member having a threaded bore opening at a surface thereof;
    (b) a second member abutting said surface of said first member and having a smooth through bore therein aligned with said threaded bore; said through bore having a counterbore opening at a surface of said second member and forming a shoulder between said through bore and said counterbore;
    (c) a first connector having a threaded shaft and a radially enlarged head on one end thereof, said shaft threadedly received in said threaded bore with said head engaging said shoulder;
    (d) said head having a length such as to be fully axially inserted in said counterbore when said head is engaged with said shoulder;
    (e) means on the distal end of said head engageable by a tool to screw said threaded shaft into said threaded bore until said head engages said shoulder;
    (f) a threaded bore axially disposed in said head and opening at the distal end of said head;
    (g) a third member abutting said surface of said second member and having a smooth through bore aligned with said threaded bore in said head;
    (h) a second connector comprising a threaded shaft and having a head on one end, said threaded shaft of said second connector inserted through said through bore in said third member and threadedly received in said threaded bore in said head of said first connector with said head of said second connector engaging a surface of said third member, and
    (i) said first and second connectors being comprised of a material having a tensile strength greater than that of said second member.

References Cited

UNITED STATES PATENTS

| | | | |
|---|---|---|---|
| 1,007,107 | 10/1911 | Hulsmann | 85—45 X |
| 1,200,474 | 10/1916 | Dunlap. | |
| 1,204,181 | 11/1916 | Norton | 85—9 X |
| 1,750,702 | 3/1930 | Carl | 85—9 X |
| 1,832,341 | 11/1931 | Williamson | 92—161 |
| 2,673,130 | 3/1954 | Becker | 92—161 X |
| 2,871,794 | 2/1959 | Mosbacher | 103—216 X |
| 2,977,936 | 4/1961 | Hermann | 92—161 X |
| 3,005,669 | 10/1961 | Nunnemacher | 92—161 |
| 3,150,570 | 9/1964 | Johnson et al. | 92—169 X |
| 3,200,717 | 8/1965 | Einsiedler | 92—161 X |

FOREIGN PATENTS

| | | |
|---|---|---|
| 315,182 | 7/1929 | Great Britain. |

MARTIN P. SCHWADRON, *Primary Examiner.*

I. C. COHEN, *Assistant Examiner.*